United States Patent Office  2,733,226
Patented Jan. 31, 1956

2,733,226

TRIARYL PHOSPHITE STABILIZERS FOR SYNTHETIC RUBBERS

Byron A. Hunter, Seymour, Conn., assignor to United States Rubber Company, New York, N. Y., a corporation of New Jersey No Drawing. Application October 12, 1951,
Serial No. 251,131

12 Claims. (Cl. 260—29.7)

This invention relates to improvements in stabilizer chemicals and their use in rubber.

The use in synthetic rubbers of triphenyl phosphite (whether or not the phenyl group is alkylated with a lower alkyl radical, i. e., one having five or less carbon atoms), is described in U. S. Patent No. 2,419,354.

Triphenyl phosphite and the lower alkylated-aryl phosphites are, however, subject to certain limitations which have seriously restricted their wide-spread use. Triphenyl phosphite, for example, when used as a stabilizer in butadiene-styrene copolymer produces a phenolic odor that is detrimental in the commercial application of the polymer. Further, triphenyl phosphite and related lower alkyl-substituted-aryl phosphites are subject to hydrolytic destruction in the presence of water. The seriousness of this will be seen when it is realized that practical use of the materials as synthetic rubber stabilizers ordinarily necessitates that they be incorporated into the aqueous synthetic rubber latex, prior to flocculation and drying. Indeed, a prime function of a GR–S stabilizer is to prevent the deterioration and resinification of the polymer which is liable to occur when the coagulum is subjected to the elevated temperatures of the drying operation during manufacture. So great is the susceptibility of improperly stabilized GR–S to oxidative deterioration at elevated temperatures that instances are known wherein the polymer has actually ignited during the drying operation. The aryl phosphites are very effective in preventing this type of degradation. Even under the most favorable conditions of incorporation, however, the simpler aryl phosphites undergo considerable hydrolytic decomposition resulting not only in the production of the odorous phenols but also in lowered concentration of active stabilizer in the polymer. Thus, an excessive amount of stabilizer must be used in order to assure the presence of an effective amount of stabilizer in the polymer. This procedure is not only wasteful but imparts an undesirable phenolic odor to the rubber.

Another deficiency of triphenyl phosphite and the lower alkyl substituted aryl phosphites is illustrated in the commercial method of incorporating triphenyl phosphite into the synthetic rubber latex. Because of the susceptibility of commercial preparations of triphenyl phosphite to hydrolytic decomposition it has not been considered practical to prepare the material in emulsion form which is recognized as the most effective way of incorporating a water-immiscible substance into latex. Instead, the commercial practice is to add the stabilizer in undiluted form to the latex immediately prior to flocculation. Under these conditions imperfect mixing of the stabilizer occurs and variability in the stabilizer content of the polymer results.

Emulsion addition of the aryl phosphite preparations to a synthetic rubber latex is desirable because it provides good dispersion of the stabilizer throughout the latex and assures adequate distribution within the rubber polymerizate. Otherwise, the relative incompatibility of the phosphite and the aqueous latex is reflected in the coagulated polymerizate and is evidenced during drying of "resinified spots" at points within the polymerizate where insufficient stabilizer has been deposited to afford adequate protection. In some cases, the resinification becomes noticeable only on storage, or when the polymerizate is subjected to heat.

I have now discovered that aryl phosphites substituted with alkyl groups containing eight or more carbon atoms are superior stabilizers for synthetic rubber. They are incorporated in a small proportion, namely, from about 0.25 to about 5 or more parts by weight based on 100 parts by weight of the rubber. Not only are these materials very effective in preventing deterioration of the rubber polymer during manufacture, they are also very beneficial in preventing degradation during storage and processing. These benefits to the synthetic rubber polymer are also evident as improved characteristics of the vulcanized products produced from the polymer. Moreover, the preferred aryl phosphites of this invention are to be greatly preferred over the simpler aryl phosphites described in U. S. Patent No. 2,419,354. The stabilizers of the present invention are not only non-discoloring but show substantially less odor and very substantially improved resistance to hydrolysis when compared to the material described in U. S. Patent No. 2,419,354.

A particularly important advantage of the aryl phosphites of the present invention is the improved mode of use of the stabilizers. As was pointed out previously, in the case of triphenyl phosphite and the lower alkylated aryl phosphites, it is required that the materials be added to the synthetic rubber latex immediately prior to flocculation of the polymer. If an attempt is made to add these simple phosphites to synthetic rubber latex in commercial storage or blending tanks, the extended contact with water under these conditions will destroy the stabilizing effectiveness of the materials before the latex can be withdrawn from the tanks and flocculated under commercially practical conditions. With the higher alkylated aryl phosphites of the present invention, however, the greatly improved resistance to hydrolysis makes possible the addition of the materials in emulsion form to the latex storage tanks. The phosphite is emulsified in water with the aid of any convenient emulsifying agent therefor (a common agent being a fatty acid soap such as sodium oleate). The latex, so treated, can be stored for periods of time consistent with commercial practice with no significant decrease in the stabilizing capacity of the stabilizer.

If it be assumed that the active portion resides in the triphenyl phosphite nucleus, then it would be expected that its stabilizing function would be diminished in proportion as it is diluted with increased weight of alkyl substituents, and that thereby larger amounts of the present stabilizers would be necessary as compared with triphenyl phosphite. This is not the case with the present stabilizers, contrary to expectation. This is shown figuratively by the following Table I.

*Table I*

| Parts of stabilizer per 100 parts of GR–S | 1.50 | 1.25 | 1.00 | 0.75 | 0.50 | 0.25 |
|---|---|---|---|---|---|---|
| Resinification time for triphenyl phosphite | 23 | 23 | 23 | 21 | 19 | 17 |
| Resinification time for tri(nonyl phenyl)phosphite | 34 | 31 | 29 | 28 | 26 | 20 |

The results become more remarkable when one compares the molecular weight of tri(nonyl phenyl)phosphite (687) with that of triphenyl phosphite (310).

Another important advantage of the chemicals of the present invention is seen in the fact that these materials form much more stable emulsions than do the aryl phosphites described in U. S. Patent No. 2,419,354. Samples of commercial triphenyl phosphite, for example, form emulsions which are generally stable for a matter of hours or at best a few days, whereas the improved chemicals of the present application easily produce emulsions which are stable for several weeks without breaking. This greatly improved emulsion stability of the preferred chemicals of the present invention is of great importance in practical commercial use of the materials.

The preferred chemicals of the present invention subscribe to the formula:

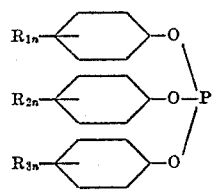

where $R_1$, $R_2$ and $R_3$ are each alkyl groups containing at least eight carbon atoms. $R_1$, $R_2$ and $R_3$ may be the same or different. $n$ is an integer of 1 to 2. The alkyl groups may be ortho, para, or meta to the oxygen. Further, the alkyl radicals may be either normal (straight) or branch-chain in character.

It is to be understood, however, that the invention can be extended to where the $R_1$, $R_2$, and $R_3$ are substituted on benzene rings that include additional relatively inert substituents such as methyl, and chlorine, which would mean that starting phenol reagents can be either cresol or chlorophenol.

Examples of chemicals which are included in the invention are:

Tri(o-octyl-phenyl)phosphite
Tri(p-nonyl-phenyl)phosphite
Tri(p-decyl-phenyl)phosphite
Tri(p-undecyl-phenyl)phosphite
Tri(p-dodecyl-phenyl)phosphite
Tri(p-tridecyl-phenyl)phosphite
Tri(p-tetradecyl-phenyl)phosphite
Tri(p-pentadecyl-phenyl)phosphite
Tri(p-hexadecyl-phenyl)phosphite
Tri(p-heptadecyl-phenyl)phosphite
Tri(p-octadecyl-phenyl)phosphite
Tri(p-eicosyl-phenyl)phosphite
p-Octyl-phenyl di(p-nonyl-phenyl)phosphite
p-Nonyl-phenyl di(p-octyl-phenyl)phosphite
p-Dodecyl-phenyl di(p-octyl-phenyl)phosphite
Tris(di-octyl-phenyl)phosphite
Tris(di-nonyl-phenyl)phosphite The unique properties of the higher alkyl-aryl phosphite preparations of the present invention mark them in their use as unique compositions of matter.

The following examples are given to illustrate the invention, the parts being by weight. Examples 1 to 8 are given as specific examples of the preparation and properties of these materials.

*Example 1.—Tri(p-octyl-phenyl)phosphite* p-Octyl phenol (p(2,2,3,3-tetramethyl-butyl)phenol) (227 grams; 1.1 mol) was placed in a 500 cc. flask equipped with stirrer, condenser, thermometer, submersion addition funnel and heating mantle. The material was warmed to 90° C. and 45.8 g. (0.33 mols) of phosphorus trichloride was added gradually over a period of 45 minutes. The mixture was then heated to 150° C. for 4 hours to complete the evolution of hydrogen chloride. After cooling, carbon dioxide was passed through the material to sweep out residual hydrogen chloride. The unreacted octyl phenol was removed by distillation under diminished pressure (0.4 mm.) until a pot temperature of 180° C. was reached. The residual product was a very light amber liquid, weighing 223 grams.

*Analysis.*—Percent phosphorus 4.78%, calculated. Found: 4.67%, 4.80%.

Specific gravity, 25° C./25° C._____ 0.9925
Refractive index, 20° C._____ 1.5289
Viscosity, 25° C._____poises__ 247

*Example 2.—Tri(nonyl-phenyl)phosphite*

Using the same apparatus described in Example 1, 243 g. (1.1 mol) of nonyl phenol derived from phenol and mixed nonenes (commercial) was reacted at 90° C. with 45.8 g. (0.33 mols) of phosphorus trichloride. The addition required 45 minutes. The reaction mixture was heated 4 hours at 150° C. and then was treated with carbon dioxide gas as described in Example 1. After distilling off the unreacted nonyl phenol under diminished pressure the tri(nonyl-phenyl)phosphite was obtained in theoretical yield as a light amber oil.

*Analysis.*—Percent phosphorus calculated, 4.5%. Found: 4.25%, 4.26%.

Specific gravity, 25°C./25°C._____ 0.9840
Refractive index, 20° C._____ 1.5262
Viscosity, 25° C._____poises__ 375

*Example 3.—Mono octyl-phenyl di(nonyl-phenyl)- phosphite*

Using an apparatus similar to that described in Example 1 (the liquid addition funnel was replaced by a removable stopper), 206.32 g. (1.0 mol) of solid p-octyl phenol(p-diisobutyl phenol) was added portionwise to 415.0 g. (3.0 mols) of phosphorus trichloride. Hydrogen chloride was copiously evolved during the addition. The mixture was then heated to reflux (75° C.-85° C.) for 2½ hours. The excess phosphorus trichloride was then removed by distillation at reduced pressure (water pump). The resulting product was fractionated under diminished pressure (2.0 mm.) and the fraction boiling between 146-151° C. (octyl phenoxy phosphorus dichloride) was retained for reaction with nonyl phenol as follows:

To 99.5 grams of the mono octyl phenoxy phosphorus dichloride (at 80° C.) was added gradually 220 grams of commercial nonyl phenol, as identified in Example 2. After the addition was complete, the reaction mixture was heated gradually to 150° C. and held at that temperature for 8 hours. The excess nonyl phenol was removed by distillation under diminished pressure (1 mm.) until a pot temperature of 195° C. was reached. The residual mono octyl phenyl di(nonyl-phenyl)phosphite was a pale yellow viscous liquid.

*Analysis.*—Percent phosphorus calculated, 4.6%. Found: 5.18%, 5.26%.

Specific gravity, 25° C./25° C _____ 0.9960
Refractive index, 20° C._____ 1.5302
Viscosity, 25° C._____poises__ 77.3

*Example 4.—Mono(nonyl-phenyl)di(octyl-phenyl)- phosphite*

To 412.0 g. (3.0 mols) of phosphorus trichloride at room temperature was added 220.0 g. (1 mol) of nonyl phenol, as identified in Example 2. After the addition was complete the reaction mixture was heated at reflux temperature for 3 hours. The excess phosphorus trichloride was removed by distillation at reduced pressure (water pump). The residue in the flask was fractionated and the portion boiling 138° C.-141° C. (1.5 mm.) comprises mono nonyl phenoxy phosphorus dichloride.

To 183.5 grams of mono(nonyl phenoxy)phosphorus dichloride was added 412 grams of melted p-octyl phenol(p-diisobutyl phenol) in small portions. After the addition was complete the temperature was increased gradually to 150° C. and maintained at that temperature for 7 hours. The excess octyl phenol was removed under diminished pressure (2.0 mm.) until a pot temperature of 160° C. was reached. The residual material (mono- (nonyl-phenyl)di(octyl-phenyl) phosphite) was a nearly colorless viscous oil.

*Analysis.*—Per cent phosphorus calculated, 4.7%. Found: 4.67%, 4.78%.

Specific gravity, 25° C./25° C_____ 0.9920
Refractive index, 20° C_____ 1.5292
Viscosity, 25° C_____poises__ 141.2

Example 5.—Tri(dodecyl-phenyl)phosphite

To 393 g. (1.5 mols) of dodecyl phenol (condensate of phenol and tetrapropylene) was added gradually (over the course of 1 hour) 68.8 g. (0.5 mol) of phosphorus trichloride. The mixture was stirred during the addition. Heat was then applied and the mixture was stirred at 150° C. for 6 hours. Dry carbon dioxide gas was then passed through the hot reaction product to remove retained hydrogen chloride. The residual material (tri-(dodecyl-phenyl)phosphite) was an amber liquid weighing 403 grams.

*Analysis.*—Per cent phosphorus calculated, 3.81%. Found: 3.87%, 3.91%.

Specific gravity, 25° C./25° C_____ 0.9652
Refractive index, 20° C_____ 1.5176
Viscosity, 25° C_____poises__ 141

Example 6.—Tri(di-nonyl-phenyl)phosphite

To 182.0 g. (0.5 mol plus 5% excess) of ortho, para-di-nonyl phenol at 90° C. was added 22.8 grams (0.166 mol) of phosphorus trichloride. The addition was made over a 1 hour period. The mixture was stirred continuously. The temperature was then increased to 150° C. and held at that point for 6 hours. Carbon dioxide gas was bubbled through the product to remove retained hydrogen chloride. The mixture was heated to 230° C. at 2 mm. pressure to remove unreacted dinonyl phenol. The residual material (tri(di-nonyl-phenyl)phosphite) was obtained in theoretical yield.

*Analysis.*—Per cent phosphorus calculated, 2.92%. Found: 3.29%.

Specific gravity, 25° C./25° C_____ 0.9494
Refractive index, 20° C_____ 1.5088
Viscosity, 25° C_____poises__ 421

Example 7.—Mixture comprising octyl and nonyl substituted triphenyl phosphites A mixture of 414 g. p-octyl phenol and 221 g. of nonyl phenol, as identified in Example 2, was heated to 90° C. and 137.5 g. of phosphorus trichloride were added gradually (over 1 hour). The mixture was heated to 150° C. for 4 hours until the evolution of hydrogen chloride was complete. After cooling, carbon dioxide was passed through the material to sweep out residual hydrogen chloride. The product is semi-liquid, and was then treated with 1.5% (10 g.) of propylene oxide to remove traces of acidic impurities.

The above mixture is difficult to completely identify but it is less viscous than the material described in Example 1.

If desired, the ratio of octyl phenol to the nonyl phenol may be varied, so long as the collective mol proportion is at least three compared to one mol proportion of the phosphorus trichloride.

Example 8.—Preparation of a mixture of nonyl-substituted phenyl phosphites

To 376.4 g. (4.0 mols) of melted phenol at 45° C., containing 10 ml. conc. sulfuric acid, 252.5 g. (2.0 mols) of tripropylene (nonene) was added gradually over 1 hour and the reaction mixture was then heated 4 hours at 85° C. The acid catalyst was removed from the cooled product by washing with 5% aqueous sodium carbonate solution. The final washing was with water. The product was dried over anhydrous sodium sulfate. The unreacted phenol was removed by topping to a distillation temperature of 97° C. at 15 mm. pressure. The residue amounted to 397.3 g. and is considered to be primarily mononyl phenol mixed with some dinonyl phenol.

To 229.2 g. of the above residue, 40.5 g. phosphorus trichloride was added at 90° C. over 1 hour. The reaction mixture was then heated 4 hours at 150° C., cooled and blown with carbon dioxide to remove hydrogen chloride.

The residue was an amber colored moderately viscous liquid. It is considered to be a mixture of triphenyl phosphites in which the phenyl groups are substituted by from one to two nonyl groups.

In order to illustrate the unique properties of the chemicals of the present invention, a comparison of the preferred chemicals with the aryl phosphites of the prior art is shown in the following examples:

Example 9

To 200 g. portions of coagulated unstabilized butadiene (75)-styrene (25) copolymer was added 3.0 g. of one of each of the aryl phosphites listed below. The chemicals were thoroughly mixed with the polymer on a rubber mill and samples were examined for odor and were subjected to oven aging at 130° C. The resinification time was taken as the period of heating of the polymer which produced a melted surface film that cracked when the cooled sample was stretched.

| | Odor | Resinification Time (130° C.) |
|---|---|---|
| (A) GR-S polymer (no stabilizer). | scorched odor | 1 hour. |
| (B) GR-S plus triphenyl phosphite. | strong phenolic | over 15 hours. |
| (C) GR-S plus tricresyl phosphite. | ___do___ | Do. |
| (D) GR-S plus tri(isopropyl phenyl) phosphite. | ___do___ | Do. |
| (E) GR-S plus tri(tert. butyl phenyl)phosphite. | definite phenolic | Do. |
| (F) GR-S plus tri(p-tert. amyl phenyl) phosphite. | ___do___ | Do. |
| (G) GR-S plus tri(p-sec. amyl phenyl) phosphite. | ___do___ | Do. |
| (H) GR-S plus tri(p-octyl phenyl) phosphite (Ex. 1). | no phenolic odor | Do. |
| (I) GR-S plus tri(nonyl phenyl) phosphite (Ex. 2). | ___do___ | Do. |
| (J) GR-S plus octyl phenyl di-(nonyl phenyl)phosphite (Ex. 3). | ___do___ | Do. |
| (K) GR-S plus nonyl phenyl di-(octyl phenyl)phosphite (Ex. 4). | ___do___ | Do. |

It can be seen that of the listed chemicals only the alkylated phenyl phosphites containing alkyl groups of eight carbon atoms or more combine the desirable features of no phenolic odor with outstanding heat stability.

While reference has been made to use of the higher alkylated phenyl phosphites as such, it is desirous to use them in a form most conveniently commercially produced, namely, without isolation, as part of the product of reaction of the phosphorus trichloride or appropriate alkyl phenoxy phosphorus dichloride with the appropriate alkyl substituted phenol or mixture of appropriate alkyl substituted phenols, along with other closely related compounds which may be formed, and except for removal of unreacted starting reagents and removal or neutralization of any hydrogen chloride that is formed.

Also, instead of using pure alkylated phenols for the reaction, more or less pure commercial preparations may be used.

The appropriate alkyl substituted phenol reagents of this invention may be made by condensing phenol, cresol, or chlorphenol with the desired olefin, in the presence of a catalyst such as sulfuric acid, boron trifluoride, or process analogous to the process as shown in U. S. Patent No. 2,008,032.

Example 10

Emulsions of the various aryl phosphites were made up as follows:

To 100 g. of the aryl phosphite [1] was added 4.0 g. of oleic acid. This mixture was warmed to pouring consistency and added gradually with high speed stirring to an alkaline soap solution made up of 394 g. of water, 1.35 g. of sodium hydroxide, and 0.65 g. of oleic acid. The emulsions were allowed to stand at room temperature and the time recorded at which particles of oil separated, indicating the breaking point of the emulsion.

|  | Emulsion stability, days |
|---|---|
| (A) Triphenyl phosphite | 3 |
| (B) Tri(octyl-phenyl)phosphite | over 10 |
| (C) Tri(nonyl-phenyl)phosphite | over 10 |
| (D) Octyl phenyl di(nonyl-phenyl)phosphite | over 10 |
| (E) Nonyl phenyl di(octyl-phenyl)phosphite | over 10 |
| (F) Tri(dodecyl-phenyl)phosphite | over 10 |
| (G) Tri(di-nonyl-phenyl)phosphite | over 10 |

The epoxide treated phosphite preparations show enhanced resistance to hydrolysis and this is reflected in the improved stability of the emulsions prepared from the treated phosphite and also in the improved properties of the synthetic rubbers which are stabilized by the phosphite preparations.

Instead of propylene oxide, other epoxy compounds may be used including ethylene oxide, styrene oxide, butadiene monoxide, glycidol, epichlorhydrin, glycidyl ethers, such as glycidyl phenyl ether, glycidyl ethyl ether, glycidyl methyl ether, glycidyl isopropyl ether, glycidyl cyclohexyl ether, isobutylene oxide, 1,2:3,4-diepoxybutane, bis(2,3-epoxy-propyl) ether, di-(2,3-epoxy propoxy)benzene, 1,2:5,6-diepoxyhexane, p-divinyl benzene dioxide, 1-vinyl 3-hexene dioxide, cyclohexene oxide, 1,2:3,4-diepoxy-1,4-dimethyl butane, 1,2:3,4-diepoxy-1,4-diphenyloctane, etc.

Example 11.—Stability of the aryl phosphites in GR–S latex

Samples of freshly prepared emulsions of aryl phosphites (prepared as in Example 10) were added in sufficient quantity to GR–S latex to provide 1.5 parts of the aryl phosphite per 100 parts of synthetic rubber hydrocarbon. The latex was stored for varying periods of time at 60° C. (normal commercial storage temperature) and then flocculated with salt and acid. The polymer was washed, dried in an oven overnight at 80° C., and then subjected to resinification tests in a 130° C. oven. For purposes of illustration the resinification data obtained after 4 hours of ageing at 130° C. is shown for GR–S polymer containing (a) triphenyl phosphite and (b) a mixture comprising octyl and nonyl substituted triphenyl phosphites (see Example 7):

| Stabilizer | Storage time in latex (at 60° C.) before flocculation (hours) | Appearance of Polymer after 4 hours at 130° C. |
|---|---|---|
| None | 0 | badly resinified. |
| Do | 1 | Do. |
| Triphenyl phosphite | 1 | not resinified. |
| Do | 2 | slightly resinified. |
| Do | 3 | badly resinified. |
| Octyl and nonyl phenyl phosphite mixture | 5 | not resinified. |
| Do | 24 | Do. |
| Do | 48 | Do. |
| Do | 78 | Do. |

The outstanding superiority of the octyl and nonyl phenyl phosphite mixture is also characteristic of the other higher alkylated phosphites of the invention.

---

[1] The aryl phosphites are substantially freed of traces of acid impurities by the addition of a small proportion, for example, 0.1%–10%, by weight, preferably about 1.5%, of propylene oxide.

Example 12.—Comparison of tri(p-tert. amyl-phenyl) phosphite and tri(p-octyl-phenyl) phosphite in GR–S latex at 60° C.

To samples of the copolymer of butadiene and styrene (GR–S) latex, tri(p-tert. amyl-phenyl)phosphite and tri-(p-octyl phenyl)phosphite were added in the ratio of 1.5 parts of stabilizer per 100 parts rubber solids. The stabilizers were added as 20% aqueous emulsions using 1% sodium oleate as emulsifying agent.

The latices were aged 24, 48, 72, 96, and 168 hours at 60° C., respectively, and then coagulated and the rubbers washed, dried, and tested for rate of resinification at 130° C.

| Time of Heating | Resinification Times (Hours) | |
|---|---|---|
| | Amyl Derivative | Octyl Derivative |
| 24 hours | 15 | 21 |
| 48 hours | 9 | 17 |
| 72 hours | 5½ | 12 |
| 96 hours | 4 | 12 |
| 168 hours | 1 | 8 |

The above data show that tri(p-tert. octyl-phenyl) phosphite is superior to tri(p-tert. amyl-phenyl)phosphite in regard to persistence in the latex.

The aqueous emulsion of the higher alkylated phosphites can be added not only to aqueous emulsions or dispersions of 1,3-butadiene-styrene copolymer rubber (GR–S), but also to stabilize emulsions or dispersions of conjugated diene polymerizate rubbers generally, which would also include such as 1,3-butadiene-acrylonitrile (GR–N), 1,3-butadiene-vinyltoluene, 1,3-butadiene-methyl methacrylate, 1,3-butadiene-methyl acrylate, 1,3-butadiene-vinyl pyridine, polybutadiene, and polyisoprene.

The stabilizers of this invention may be used with or without other preservatives, or with fillers, accelerators, vulcanizing agents, or compounding ingredients of any desired sort known to the art. The components of the rubber compositions may be used in various ratios and it is not intended to limit the invention to the amounts of ingredients indicated in the examples given.

The invention may be used in the manufacture of tubes, hose, wire insulation, boots, shoes, surgical instruments, drug sundries, dipped synthetic rubber articles, vehicle tires, coating compositions, etc.

Having thus described my invention, what I claim and desire to protect by Letters Patent is:

1. An aqueous emulsion of a rubbery conjugated diene polymerizate stabilized with a small proportion of a chemical comprising the general formula

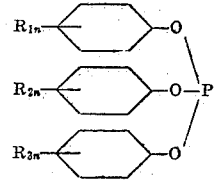

where $n$ is an integer of from 1 to 2; and $R_1$, $R_2$, and $R_3$ are alkyl radicals selected from the class consisting of octyl, nonyl, and dodecyl radicals.

2. An aqueous emulsion of a rubbery conjugated diene polymerizate stabilized with a small proportion of a tri-(octyl-phenyl)phosphite.

3. An aqueous emulsion of a rubbery conjugated diene polymerizate stabilized with a small proportion of a tri-(nonyl-phenyl)phosphite.

4. An aqueous emulsion of a rubbery conjugated diene polymerizate stabilized with a small proportion of a mono-octyl phenyl di(nonyl-phenyl)phosphite.

5. An aqueous emulsion of a rubbery conjugated diene polymerizate stabilized with a small proportion of a tri-(dodecyl-phenyl)phosphite.

6. An aqueous emulsion of a rubbery conjugated diene polymerizate stabilized with a small proportion of a triphenyl phosphite preparation in which each benzene ring is linked to from one to two alkyl groups, each alkyl group containing at least eight carbon atoms, said phosphite being treated with from 0.1–10% by weight, based on the phosphite, of an organic epoxy compound which is an epoxy alkane having an oxygen atom in union with adjacent carbon atoms.

7. An aqueous emulsion of a rubbery butadiene-styrene polymerizate stabilized with a small proportion of a triphenyl phosphite preparation in which each benzene ring is linked to from one to two alkyl groups, each alkyl group containing at least eight carbon atoms, said phosphite being treated with from 0.1–10% by weight, based on the phosphite, of an epoxy compound which is an epoxy alkane having an oxygen atom in union with adjacent carbon atoms.

8. An aqueous emulsion of a rubbery butadiene-acrylonitrile polymerizate stabilized with a small proportion of a triphenyl phosphite preparation in which each benzene ring is linked to from one to two alkyl groups, each alkyl group containing at least eight carbon atoms, said phosphite being treated with from 0.1–10% by weight, based on the phosphite, of an epoxy compound which is an epoxy alkane having an oxygen atom in union with adjacent carbon atoms.

9. A rubbery butadiene-styrene polymerizate stabilized with a small proportion of a tri(nonyl-phenyl)phosphite.

10. An aqueous emulsion of a rubbery conjugated diene polymerizate stabilized with a small proportion of a triphenyl phosphite preparation in which each benzene ring is linked to from one to two alkyl groups, each alkyl group containing at least eight carbon atoms, said phosphite being treated with from 0.1–10% by weight, based on the phosphite, of propylene oxide.

11. A rubbery conjugated diene polymerizate stabilized with a small proportion of a chemical comprising the general formula

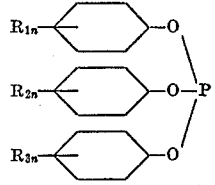

where $n$ is an integer of from 1 to 2; and $R_1$, $R_2$, and $R_3$ are alkyl radicals selected from the class consisting of octyl, nonyl, and dodecyl radicals.

12. A rubbery conjugated diene polymerizate stabilized with a small proportion of a triphenyl phosphite preparation in which each benzene ring is linked to from one to two alkyl groups, each alkyl group containing at least eight carbon atoms, said phosphite being treated with from 0.1–10% by weight, based on the phosphite, of an organic epoxy compound which is an epoxy alkane having an oxygen atom in union with adjacent carbon atoms.

References Cited in the file of this patent

UNITED STATES PATENTS

| | | |
|---|---|---|
| 2,220,845 | Moyle | Nov. 5, 1940 |
| 2,246,059 | Moran et al. | June 17, 1941 |
| 2,419,354 | Howland et al. | Apr. 22, 1947 |
| 2,612,488 | Nelson | Sept. 30, 1952 |